United States Patent
Lee (10) Patent No.: US 12,328,423 B2
(45) Date of Patent: Jun. 10, 2025

(54) MULTISTEREO CAMERA APPARATUS

(71) Applicant: SAMSUNG ELECTRO-MECHANICS CO., LTD., Suwon-si (KR)

(72) Inventor: Jae Chan Lee, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 139 days.

(21) Appl. No.: 17/951,531

(22) Filed: Sep. 23, 2022

(65) Prior Publication Data

US 2023/0109704 A1   Apr. 13, 2023

(30) Foreign Application Priority Data

Oct. 13, 2021 (KR) .................. 10-2021-0135594

(51) Int. Cl.
   *H04N 13/243* (2018.01)
(52) U.S. Cl.
   CPC .................. *H04N 13/243* (2018.05)
(58) Field of Classification Search
   CPC .................................... H04N 13/243
   USPC ............................................. 348/48
   See application file for complete search history.

(56) References Cited

U.S. PATENT DOCUMENTS

2020/0128225 A1* 4/2020 Ge .................. G06F 18/251

FOREIGN PATENT DOCUMENTS

| JP | 2020-53950 A | 4/2020 | |
| KR | 10-2006-0115209 A | 11/2006 | |
| KR | 10-2014-0061089 A | 5/2014 | |
| WO | WO-2021182153 A1 * | 9/2021 | |
| WO | WO-2023027708 A1 * | 3/2023 | ........... H04N 13/161 |

OTHER PUBLICATIONS

Notice of Reason for Rejection issued on Nov. 20, 2022, in counterpart Korean Patent Application No. 10-2021-0135594 (5 pages in English, 4 pages in Korean).

* cited by examiner

*Primary Examiner* — Rowina J Cattungal
(74) *Attorney, Agent, or Firm* — NSIP Law (57) ABSTRACT

A multistereo camera apparatus includes a first camera having a first focal length, a second camera having a second focal length different from the first focal length, and a third camera having an adjustable third focal length, wherein the third camera operates in a pair with the first camera to measure a first distance, or in a pair with the second camera to measure a second distance different from the first distance.

20 Claims, 5 Drawing Sheets

MULTISTEREO CAMERA APPARATUS

CROSS-REFERENCE TO RELATED APPLICATIONS

This application claims the benefit under 35 USC 119(a) of Korean Patent Application No. 10-2021-0135594 filed on Oct. 13, 2021, in the Korean Intellectual Property Office, the entire disclosure of which is incorporated herein by reference for all purposes.

BACKGROUND

1. Field

The present disclosure relates to a multistereo camera apparatus.

2. Description of the Background

Generally, a technique related to an advanced driver assistance system (ADAS), in consideration of convenience of a driver, has been researched and developed with respect to a vehicle.

Such an ADAS may provide driver-friendly functions such as a lane departure warning system (LDWS), a forward collision warning system (FCWS), blind spot detection (BSD) using a vehicle detection sensor such as a camera, a lidar, a radar, an ultrasonic wave alone or combining several sensors.

In an autonomous driving system in which a vehicle autonomously drives, it may be important to accurately measure a distance to surrounding objects for stable driving.

Recently, in relation to a head-on collision of a car, a lane keeping assist system (LKAS), or the like, may already have been commercialized, and in the future, it may be expected that autonomous vehicles would have new functions such as highway merging road automatic driving system, intersection autonomous passage system, and automated intersection passing.

These newly required functions may be insufficient to cover only with a general forward-facing camera which uses a narrow angle. A wide view such as areas to the left and right in the direction of travel may need to be seen using a wide angle, it may need to be able to predict collision by sensing, and a general forward sensing distance may need to be maintained or expanded.

A mono-based forward camera system has been used to measure a distance in a general vehicle, but such a general mono-based forward camera system may have a problem in that it may be impossible to accurately measure a distance over a long distance while driving at high speed.

Also, interest in stereo camera devices for measuring a distance more accurately while a vehicle is driving has increased, but even in such a stereo camera system, it may be difficult to accurately measure distances, such as long and short distances, simultaneously, due to limitations of a fixed focal length.

The above information is presented as background information only to assist with an understanding of the present disclosure. No determination has been made, and no assertion is made, as to whether any of the above might be applicable as prior art with regard to the disclosure.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a multistereo camera apparatus includes a first camera having a first focal length, a second camera having a second focal length different from the first focal length, and a third camera having an adjustable third focal length, wherein the third camera operates in a pair with the first camera to measure a first distance, or in a pair with the second camera to measure a second distance different from the first distance.

When the third camera operates in a pair with the first camera to measure the first distance, the adjustable third focal length of the third camera may be adjusted to correspond to the first focal length of the first camera.

When the third camera operates in a pair with the second camera to measure the second distance, the adjustable third focal length of the third camera may be adjusted to correspond to the second focal length of the second camera.

The multistereo camera apparatus may further include a focal length adjustment device configured to adjust the adjustable third focal length of the third camera.

The multistereo camera apparatus may further include a baseline adjustment device configured to adjust a first baseline between the third camera and the first camera and a second baseline between the third camera and the second camera in association with operation of the focal length adjustment device.

The third camera may be disposed between the first camera and the second camera.

The multistereo camera apparatus may further include a baseline adjustment device configured to adjust a position of the third camera to adjust first and second baselines, wherein the first baseline may be a distance between the third camera and the first camera, and the second baseline may be a distance between the third camera and the second camera.

The multistereo camera apparatus may further include a focal length adjustment device configured to adjust the adjustable third focal length of the third camera according to operation of the baseline adjustment device.

In another general aspect, a multistereo camera apparatus includes a first camera having a first focal length, a second camera having a second focal length different from the first focal length, a third camera having a third focal length which is adjustable, and a control device configured to control the third camera, wherein the control device controls the third camera and the first camera to operate in a pair with each other to measure a first distance, or controls the third camera and the second camera to operate in a pair with each other to measure a second distance different from the first distance.

When the third camera operates in a pair with the first camera to measure the first distance, the control device may adjust the third focal length of the third camera to correspond to the first focal length of the first camera.

When the third camera operates in a pair with the second camera to measure the second distance, the control device may adjust the third focal length of the third camera to correspond to the second focal length of the second camera.

The multistereo camera apparatus may further include a focal length adjustment device configured to adjust the third focal length of the third camera under control of the control device.

The multistereo camera apparatus may further include a baseline adjustment device configured to adjust a first baseline between the third camera and the first camera and a second baseline between the third camera and the second camera in association with operation of the focal length adjustment device under control of the control device.

The multistereo camera apparatus may further include a baseline adjustment device configured to adjust a position of the third camera to adjust a first baseline between the third camera and the first camera, and a second baseline between the third camera and the first camera under control of the control device.

The multistereo camera apparatus may further include a focal length adjustment device configured to adjust the third focal length of the third camera in association with operation of the baseline adjustment device under control of the control device.

In another general aspect, a multistereo camera apparatus includes a first camera, a second camera, and a third camera disposed between the first camera and the second camera, and having a variable focal length, wherein a distance between the third and first cameras may be different than a distance between the third and second cameras.

The third camera may be movable such that the distance between the first and third cameras and the distance between the second and third cameras may be adjustable.

The first camera may have a first focal length, and the second camera may have a second focal length different from the first focal length.

The multistereo camera apparatus may further include a controller, wherein the third camera may be movable such that the distance between the first and third cameras and the distance between the second and third cameras may be adjustable, and wherein the controller controls the variable focal length of the third camera and movement of the third camera such that the third camera and the first camera operate in a pair with each other to measure a first distance, and the third camera and the second camera operate in a pair with each other to measure a second distance different from the first distance.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Hereinafter, while examples of the present disclosure will be described in detail with reference to the accompanying drawings, it is noted that examples are not limited to the same.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of this disclosure. For example, the sequences of operations described herein are merely examples, and are not limited to those set forth herein, but may be changed as will be apparent after an understanding of this disclosure, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of this disclosure.

Throughout the specification, when an element, such as a layer, region, or substrate is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items; likewise, "at least one of" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms, such as "above," "upper," "below," "lower," and the like, may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being "above," or "upper" relative to another element would then be "below," or "lower" relative to the other element. Thus, the term "above" encompasses both the above and below orientations depending on the spatial orientation of the device. The device may also be oriented in other ways (rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes shown in the drawings may occur. Thus, the examples described herein are not limited to the specific shapes shown in the drawings, but include changes in shape that occur during manufacturing.

Herein, it is noted that use of the term "may" with respect to an example, for example, as to what an example may include or implement, means that at least one example exists in which such a feature is included or implemented while all examples are not limited thereto.

The features of the examples described herein may be combined in various ways as will be apparent after an understanding of this disclosure. Further, although the examples described herein have a variety of configurations, other configurations are possible as will be apparent after an understanding of this disclosure.

One or more example embodiments of the present disclosure provide a multistereo camera apparatus which may accurately measure a relatively short distance and a relatively long distance, and may reduce a measurement error due to a variable focal length.

Figure 1:
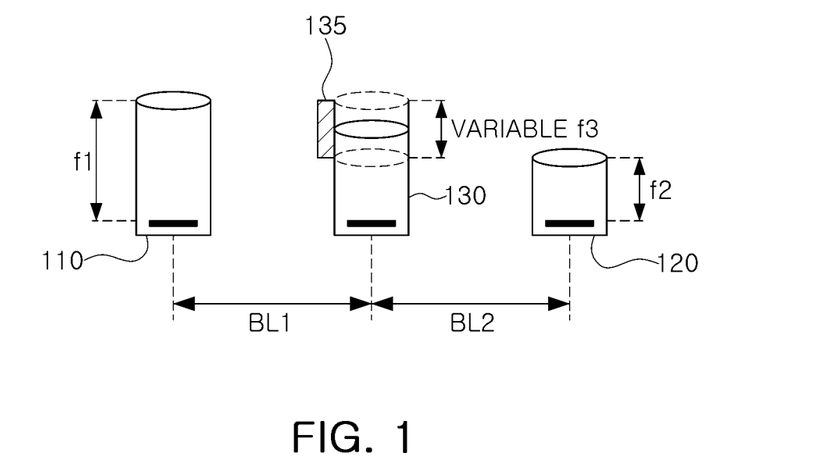
FIG. 1 is a diagram illustrating a multistereo camera apparatus according to an example embodiment of the present disclosure.

FIG. 1 is a diagram illustrating a multistereo camera apparatus according to an example embodiment.

Referring to FIG. 1, the multistereo camera apparatus may include a first camera 110, a second camera 120, and a third camera 130.

The first camera 110 may have a first focal length f1. For example, the first focal length f1 may be fixed, but an example embodiment thereof is not limited thereto, and the first focal length f1 may be variable.

The second camera 120 may have a second focal length f2, different from the first focal length f1. For example, the second focal length f2 may be fixed, but an example embodiment thereof is not limited thereto, and the second focal length f2 may be variable.

The third camera 130 may have an adjustable third focal length f3. For example, the third focal length f3 may be adjusted to be equal to the first focal length f1 or may be adjusted to be equal to the second focal length f2.

In FIG. 1, a first baseline BL1 may be a distance between the third camera 130 and the first camera 110, and the second baseline BL2 may be a distance between the third camera 130 and the second camera 120.

In the example embodiment, the first baseline BL1 and the second baseline BL2 may be different from each other for optimal distance measurement. For example, the first baseline BL1 and the second baseline BL2 may be fixed or may be varied in association with the variable focal length of the third camera 130.

For example, when the first focal length f1 is shorter than the second focal length f2, short-distance measurement may be possible through the first camera 110 and the third camera 130, and relatively, long-distance measurement may be possible through the second camera 120 and the third camera 130.

For example, when the first camera 110 and the third camera 130 operate in pair to measure a short distance, the first baseline BL1 between the first camera 110 and the third camera 130 may be adjusted to suit the first focal length f1. Also, when the second camera 120 and the third camera 130 operate in a pair to measure a long distance, the second baseline BL2 between the second camera 120 and the third camera 130 may be adjusted to suit the focal length f2. A detailed description thereof will be provided later.

For each drawing of the example embodiment, unnecessary redundant descriptions for the components having the same reference numerals and the same function may not be provided, and possible differences may be described with respect to the drawings.

Figure 2:
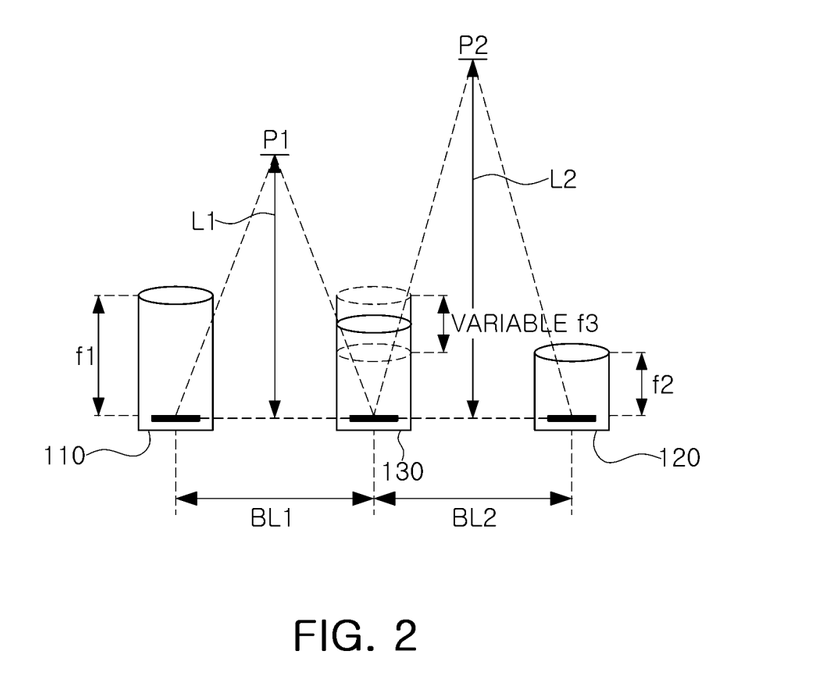
FIG. 2 is a diagram illustrating a first distance and a second distance in a multistereo camera apparatus according to an example embodiment of the present disclosure.

FIG. 2 is a diagram illustrating a first distance and a second distance in a multistereo camera apparatus according to an example embodiment.

Referring to FIGS. 1 and 2, the multistereo camera apparatus may further include a focal length adjustment device 135 (FIG. 1).

The focal length adjustment device 135 (FIG. 1) may adjust the third focal length f3 of the third camera 130 to measure the distance more accurately.

As an example, the focal length adjustment device 135 may include an actuator for adjusting the position of the focal lens using electromagnetic force between a coil and a magnet, and the focal length may be adjusted through the actuator. The structure of such an actuator is not limited to any particular example.

For example, the third camera 130 may operate in a pair with the first camera 110 to measure the first distance L1.

When the third camera 130 operates in a pair with the first camera 110 to measure the first distance L1, the third focal length f3 of the third camera 130 may be adjusted to correspond to the first focus f1 of the first camera 110.

Also, the third camera 130 may operate in a pair with the second camera 120 to measure a second distance L2 that is different from the first distance L1.

When the third camera 130 operates in a pair with the second camera 120 to measure the second distance L2, the third focal length f3 of the third camera 130 may be adjusted to correspond to the second focus f2 of the second camera 120.

For example, the third camera 130 may be disposed between the first camera 110 and the second camera 120, but an example embodiment thereof is not limited thereto.

For example, the first distance L1 may be shorter than the second distance L2. In this case, short-distance measurement may be possible through the first camera 110 and the third camera 130, and relatively long-distance measurement may be possible through the second camera 120 and the third camera 130.

Alternatively, the first distance L1 may be greater than the second distance L2, and in this case, long-distance measurement may be possible through the first camera 110 and the third camera 130, and relatively short distance measurement may be possible through the second camera 120 and the third camera 130.

According to the example embodiment, a distance measurement error (e.g., a change in depth error) may be reduced during relatively short-distance and long-distance measurement using a stereo camera.

Figure 3:
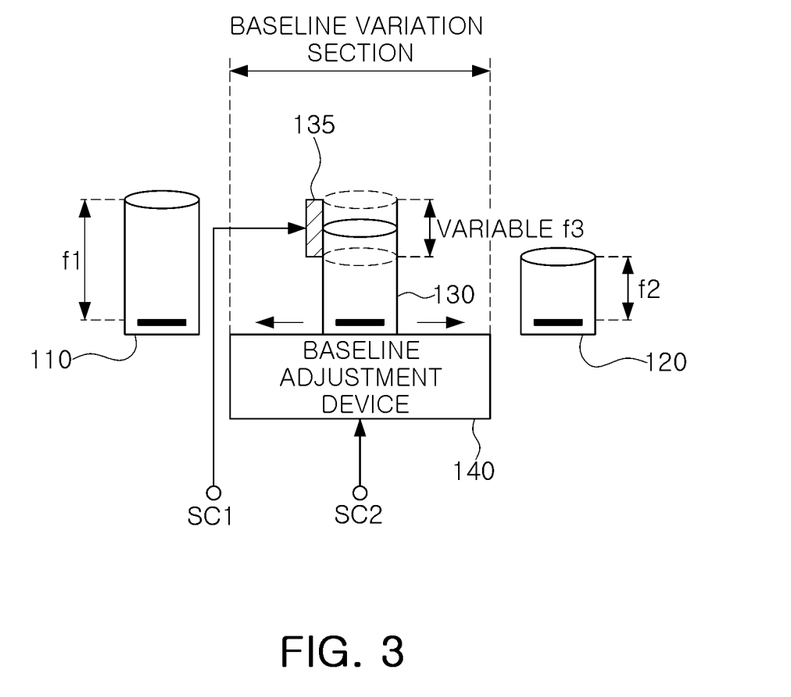
FIG. 3 is a diagram illustrating a multistereo camera apparatus according to an example embodiment of the present disclosure.

FIG. 3 is a diagram illustrating a multistereo camera apparatus according to an example embodiment.

Referring to FIG. 3, the multistereo camera apparatus may include the aforementioned focal length adjustment device 135 and a baseline adjustment device 140.

The focal length adjustment device 135 may adjust the third focus f3 of the third camera 130 in response to a first control signal SC1.

The baseline adjustment unit 140 may adjust the position of the third camera 130 to be relatively close to the first camera 110 or to the second camera 120 in response to the second control signal SC2 to measure the distance more accurately.

Accordingly, a first baseline BL1 between the third camera 130 and the first camera 110, and a second baseline between the third camera 130 and the second camera 120 (BL2) may be adjusted. The baseline adjustment device 140 and the focal length adjustment device 135 may operate in association with each other in response to a first control signal and a second control signal.

For example, the baseline adjustment device 140 may include a rail structure for moving the position of the third camera 130, but an example embodiment thereof is not limited thereto.

For example, when the first camera 110 and the third camera 130 operate in a pair to measure a short distance, the first baseline BL1 between the first camera 110 and the third camera 130 may be adjusted to suit the first focal length f1 by the baseline adjustment device 140. Also, when the second camera 120 and the third camera 130 operate in a pair to measure a distance, the second baseline BL2 between the second camera 120 and the third camera 130 may be adjusted to suit the second focal length f2 by the baseline adjustment device 140.

For example, when the first distance L1 is shorter than the second distance L2, and the first camera 110 and the third camera 130 operate in a pair to measure a short distance, the distance to the first baseline BL1 may also be adjusted to be relatively shorter to suit the first focal length f1. Also, when the second distance L2 is greater than the first distance L1, the second camera 120 and the third camera 130 may operate in a pair to measure a long distance, the distance of the second baseline BL2 may also be adjusted to be relatively longer to suit the second focal length f2.

Figure 4:
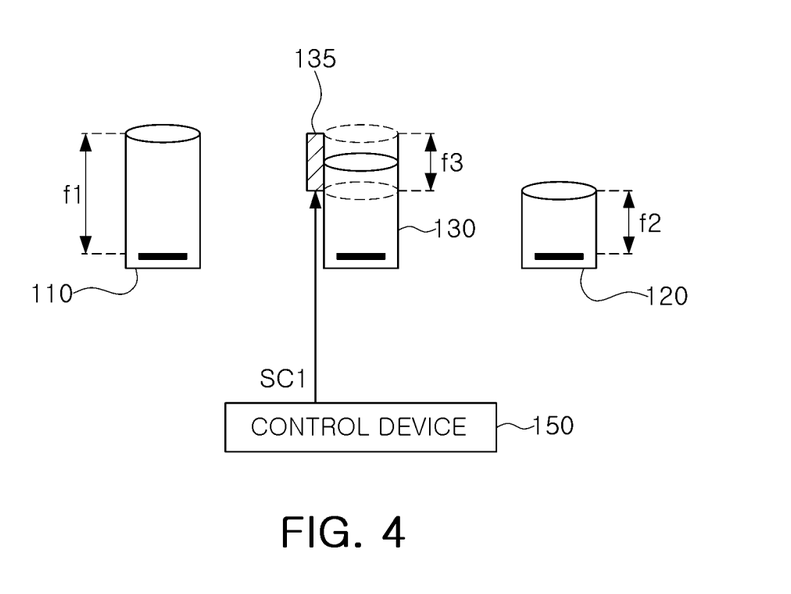
FIG. 4 is a diagram illustrating a multistereo camera apparatus according to an example embodiment of the present disclosure.
Figure 5:
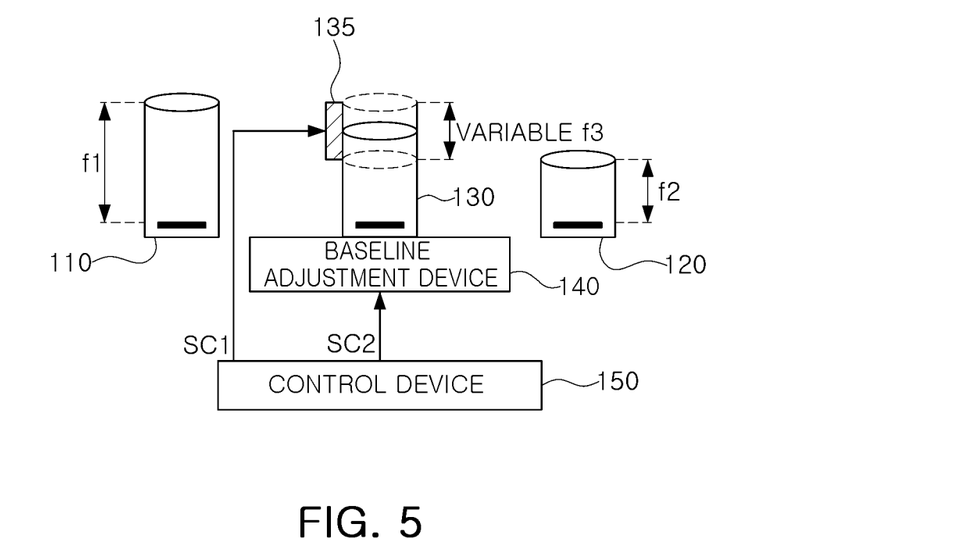
FIG. 5 is a diagram illustrating a multistereo camera apparatus according to an example embodiment of the present disclosure.

FIG. 4 is a diagram illustrating a multistereo camera apparatus according to an example embodiment. FIG. 5 is a diagram illustrating a multistereo camera apparatus according to an example embodiment.

Referring to FIGS. 4 and 5, the multistereo camera apparatus may include a first camera 110, a second camera 120, a third camera 130, and a control device 150.

The descriptions of the first camera 110, the second camera 120, and the third camera 130 are the same as the descriptions described with reference to FIGS. 1 to 3, and thus may not be repeated.

The control device 150 may control the third camera 130 in relation to a focus and/or a position.

For example, referring to FIG. 4, the control device 150 may control such that the third focus f3 of the third camera 130 may match the first focus f1 or the second focus f2 through the focal length adjustment device 135.

Also, referring to FIG. 5, the control device 150 may, by controlling the position of the third camera 130 through the baseline adjustment device 140, adjust the first baseline BL1 between the third camera 130 and the first camera 110 and the second baseline BL2 between the third camera 130 and the second camera 120 to perform short-distance and long-distance measurement more accurately.

Also, the control device 150 may control the third camera 130 and the first camera 120 to operate in a pair to measure the first distance L1 (e.g., short distance).

In this case, the control device 150 may control the third camera 130 and the first camera 110 to operate in a pair to measure the first distance L1, and to measure the distance more accurately, the control device 150 may control the third focal length f3 of the third camera 130 to correspond to the first focal length f1 of the first camera 110 through the focal length adjustment device 135.

Also, the control device 150 may control the third camera 130 and the second camera 120 to operate in a pair to measure the second distance L2 (e.g., long distance) different from the first distance L1 (e.g., short distance).

In this case, the control device 150 may control the third camera 130 and the second camera 120 to operate in a pair to measure the second distance L2, and to measure the distance more accurately, the control device 150 may control the third focal length f3 of the third camera 130 to correspond to the second focal length f2 of the second camera 120 through the focal length adjustment device 135.

Generally, as for accuracy of measurement by the camera, the wider the baseline, which is the distance between the two cameras, or the greater the focal length, the more favorable the measurement accuracy may be, but since the baseline may not be increased indefinitely, in the example embodiment, a wide-angle camera may be used for measuring a short distance, a narrow-angle camera may be used for long-distance measurement, and to match this, the baseline, which is the distance between the two cameras, may be adjusted, such that each distance may be measured as accurately as possible.

As described above, by adjusting the focal length for each measurement distance, such as a relatively short distance and a relatively long distance, and adjusting the baseline to match this, each distance may be accurately measured, and accordingly, measurement errors such as a depth error can be reduced.

When the first camera 110 is implemented as a wide-angle camera, the camera may measure a wide range including the left and right sides, such that a short-distance around the left and right sides may be measured during low-speed driving, and even when the second camera 120 is implemented as a narrow-angle camera, a narrow range including a long distance measured, such that a long distance forwards may be measured during high-speed driving.

Figure 6:
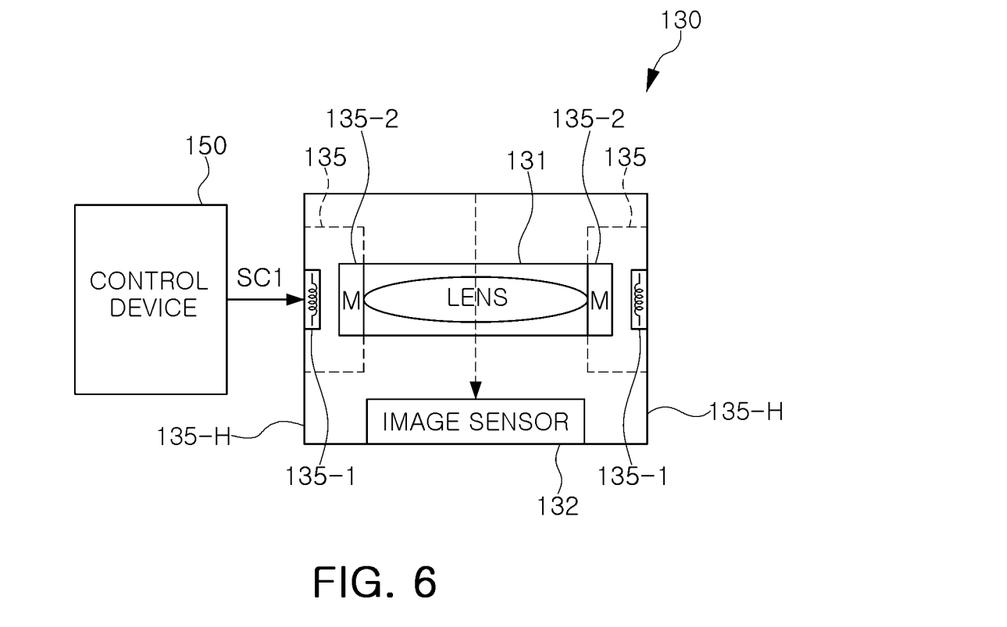
FIG. 6 is a diagram illustrating a variable focus device for changing a focus of a camera according to an example embodiment of the present disclosure.

FIG. 6 is a diagram illustrating a variable focus device for changing a focus of a camera according to an example embodiment.

Referring to FIG. 6, the third camera 130 may include a lens module 131, an image sensor 132, and a focal length adjustment device 135.

For example, the focal length adjustment device 135 may be implemented as a voice coil motor (VCM) actuator, but an example embodiment thereof is not limited thereto, and the focal length adjustment device 135 may have a structure capable of adjusting the focus of the camera.

For example, when the focal length adjustment device 135 is implemented as a voice coil motor (VCM) actuator, the focal length adjustment device 135 may include a driving coil 135-1 and a magnet 135-2.

The driving coil 135-1 may be mounted on the housing 135-H of the third camera 130, and the magnet 135-2 may be mounted on the lens module 131 mounted on the lens module 131 to be moveable in the housing 135-H.

Generally, when electromagnetic force is generated while a driving current flows in the driving coil 135-1 according to the control device 150, the third focus f3 of the third camera 130 may be adjusted by the principle in which the magnet 135-2 may move by the electromagnetic force. Here, the direction of the electromagnetic force acting on the magnet 135-2 may be determined depending on the direction of the driving current.

Figure 7:
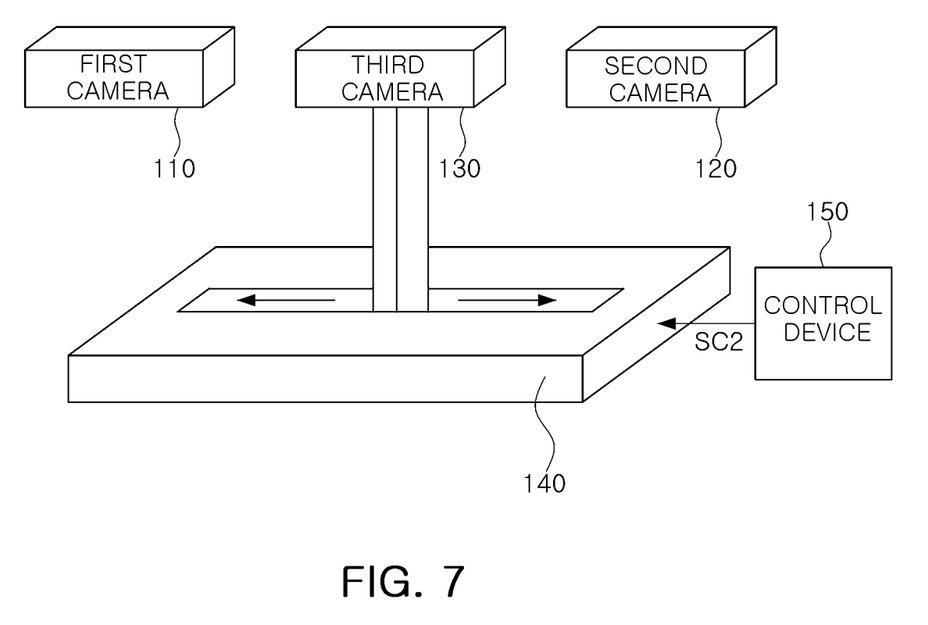
FIG. 7 is a diagram illustrating a baseline adjustment device for adjusting a baseline of a multistereo camera apparatus according to an example embodiment of the present disclosure.

FIG. 7 is a diagram illustrating a baseline adjustment device for adjusting a baseline of a multistereo camera apparatus according to an example embodiment.

Referring to FIG. 7, the baseline adjustment device 140 may have a structure capable of moving the position of the third camera 130. For example, the baseline adjustment device 140 may have a rail structure, but an example embodiment thereof is not limited thereto.

The baseline adjustment device 140 may move along a rail in response to control of the control device 150 as described above, and may adjust the position of the third camera 130 to be close to the first camera or close to the second camera 120. For example, the third camera 130 may move forward toward the first camera 110 or toward the second camera 120 to suit each measured distance.

Accordingly, the first baseline BL1 between the third camera 130 and the first camera 110, and the second baseline BL2 between the third camera 130 and the second camera 120 may be adjusted.

Figure 8:
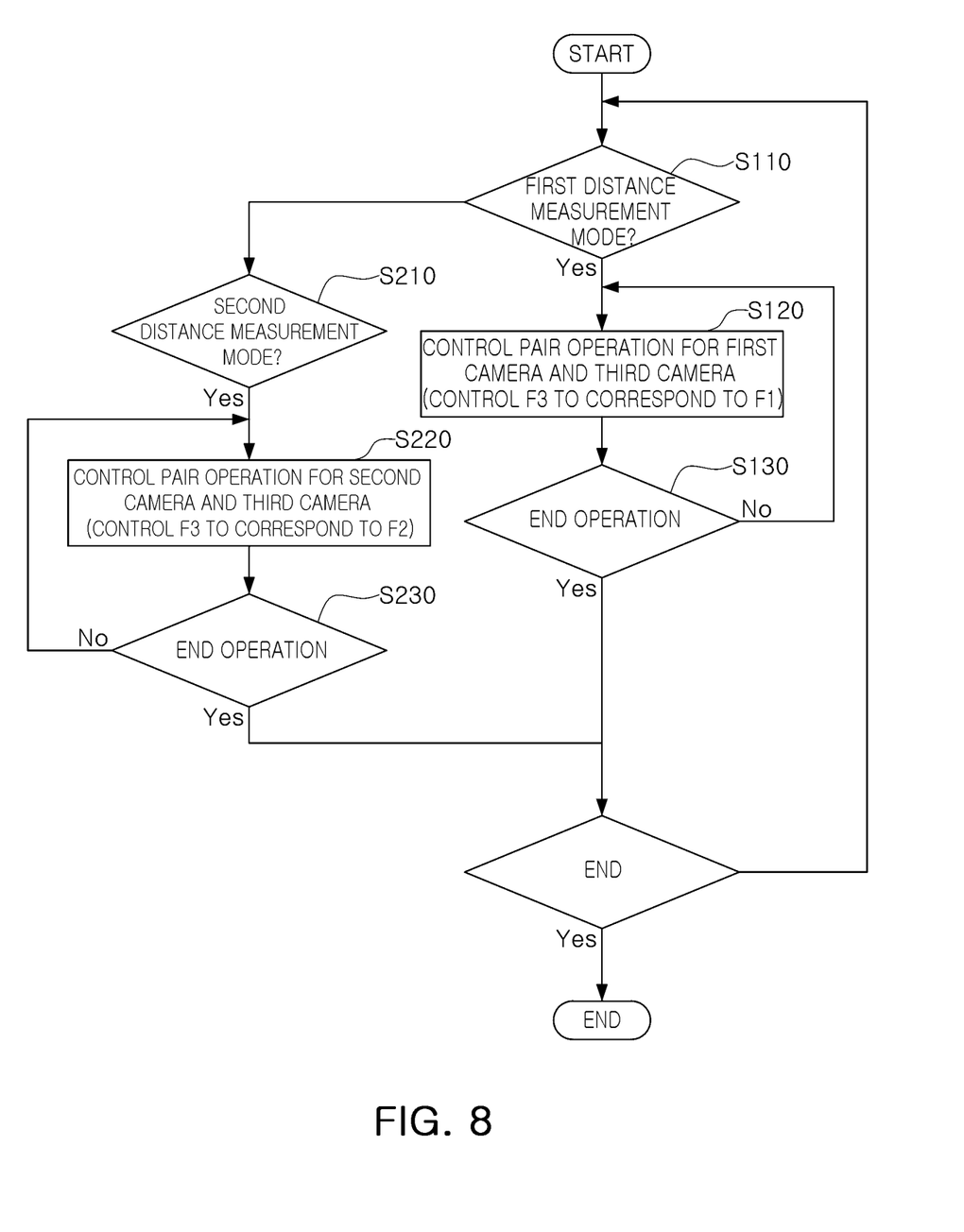
FIG. 8 is a flowchart illustrating an example of processes of operation of a multistereo camera apparatus.

FIG. 8 is a flowchart illustrating an example of processes of operation of a multistereo camera apparatus.

Referring to FIGS. 1 to 8, the multistereo camera apparatus may operate in at least one of a first distance measurement mode and a second distance measurement mode.

For example, the multistereo camera apparatus may operate in the first distance measurement mode (S110), the control device 150 (FIG. 5) may control the third camera 130 (FIG. 5) and the first camera 110 (FIG. 5) to operate in a pair with each other to measure the first distance (L1, FIG. 2). In this case, the third focal length f3 (FIG. 5) of the third camera 130 (FIG. 5) may be controlled to correspond to the first focal length f1 (FIG. 5) of the first camera 110 (FIG. 5) through the focal length adjustment device 135 (FIG. 5) (S120). For example, in operation S120, the control device 150 (FIG. 5) may control the baseline adjustment device 140 (FIG. 5) to adjust the first baseline BL1 (FIG. 2) between the third camera 130 and the first camera 110 to suit the first focal length f1 to measure the first distance (L1, FIG. 2), a relatively short distance, more accurately.

Thereafter, when the measurement of the first distance L1 (FIG. 2) is completed, it may be determined to terminate the operation (S130).

As another example, in the second distance measurement mode (S210), the control device 150 (FIG. 5) may control the third camera 130 (FIG. 5) and the second camera 120 (FIG. 5) to operate in a pair to measure the second distance L2 (FIG. 2) different from the first distance L1 (FIG. 2). In this case, the third focal length f3 (FIG. 5) of the third camera 130 (FIG. 5) may be controlled to correspond to the second focal length f2 (FIG. 5) of the second camera 120 (FIG. 5) through the focal length adjustment device 135 (FIG. 5) (S220). For example, in operation S220, the control device 150 (FIG. 5) may control the baseline adjustment device 140 (FIG. 5) to adjust the second baseline BL2 (FIG. 2) between the third camera 130 and the second camera 120 to suit the second focal length f2 to measure the second distance (L2, FIG. 2), a relatively long distance, more accurately.

Thereafter, when the measurement for the second distance (L2, FIG. 2) is completed, it may be determined to terminate the operation (S230), and when the operation is not finished, the process of determining the measurement mode, which is the first process of the operation, may be repeated.

Meanwhile, the control device of the multistereo camera apparatus according to an example embodiment may be implemented in a computing environment in which a processor (e.g., a central processing unit (CPU), a graphic processing unit (GPU), a microprocessor, an application specific integrated circuit (ASIC), field programmable gate arrays (FPGA), or the like), a memory (e.g. volatile memory (e.g. RAM, or the like), a non-volatile memory (e.g. ROM, flash memory, or the like), input devices (e.g. a keyboard, mouse, pen, voice input device, touch input device, infrared camera, video input device, or the like), output device (e.g., display, speaker, printer, or the like) and a communication connection device (e.g., modem, network interface card (NIC), integrated network interface, radio frequency transmitter/receiver, infrared port, USB interface, or the like) are interconnected (e.g., peripheral component interconnect (PCI), USB, firmware (IEEE 1394), optical bus architecture, network, or the like).

According to the aforementioned example embodiments, in a multistereo camera apparatus, an effect in which a relative short distance and a relatively long distance may be more accurately measured, and a measurement error (e.g., a depth error) according to variations in a focal length may be reduced may be obtained.

Also, the multistereo camera apparatus may have advantages as described herein, such as:

(1) Forward left and right images in the moving direction may be obtained through the wide-angle image of the wide-angle camera;

(2) Long-distance images may be obtained using a focal length of the narrow-angle camera;

(3) Parallax may be obtained by combining partial images of wide-angle and narrow-angle cameras;

(4) The image of an invisible part of the narrow-angle camera may be covered from the image of the wide-angle camera; and (5) the depth error on the wide-angle side may be reduced when obtaining distance information The cameras, lens module, image sensor 132, focal length adjustment device 135, baseline adjustment device 140, control device 150, processors, memories, and other apparatuses, devices, units, modules, and components described herein with respect to FIGS. 1-8 are implemented by or representative of hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer.

Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-8 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions used herein, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While specific examples have been shown and described above, it will be apparent after an understanding of this disclosure that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A multistereo camera apparatus, comprising:
a first camera having a first focal length;
a second camera having a second focal length different from the first focal length; and
a third camera having an adjustable third focal length,
wherein the third camera operates in a pair with the first camera to measure a first distance and in a pair with the second camera to measure a second distance different from the first distance.

2. The multistereo camera apparatus of claim 1, wherein, when the third camera operates in a pair with the first camera to measure the first distance, the adjustable third focal length of the third camera is adjusted to correspond to the first focal length of the first camera.

3. The multistereo camera apparatus of claim 1, wherein, when the third camera operates in a pair with the second camera to measure the second distance, the adjustable third focal length of the third camera is adjusted to correspond to the second focal length of the second camera.

4. The multistereo camera apparatus of claim 1, further comprising:
a focal length adjustment device configured to adjust the adjustable third focal length of the third camera.

5. The multistereo camera apparatus of claim 4, further comprising:
a baseline adjustment device configured to adjust a first baseline between the third camera and the first camera and a second baseline between the third camera and the second camera in association with operation of the focal length adjustment device.

6. The multistereo camera apparatus of claim 1, wherein the third camera is disposed between the first camera and the second camera.

7. The multistereo camera apparatus of claim 6, further comprising:
a baseline adjustment device configured to adjust a position of the third camera to adjust first and second baselines,
wherein the first baseline is a distance between the third camera and the first camera, and the second baseline is a distance between the third camera and the second camera.

8. The multistereo camera apparatus of claim 7, further comprising:
a focal length adjustment device configured to adjust the adjustable third focal length of the third camera according to operation of the baseline adjustment device.

9. A multistereo camera apparatus, comprising:
a first camera having a first focal length;
a second camera having a second focal length different from the first focal length;
a third camera having a third focal length which is adjustable; and
a control device configured to control the third camera,
wherein the control device controls the third camera and the first camera to operate in a pair with each other to measure a first distance, and controls the third camera and the second camera to operate in a pair with each other to measure a second distance different from the first distance.

10. The multistereo camera apparatus of claim 9, wherein, when the third camera operates in a pair with the first camera to measure the first distance, the control device adjusts the third focal length of the third camera to correspond to the first focal length of the first camera.

11. The multistereo camera apparatus of claim 9, wherein, when the third camera operates in a pair with the second camera to measure the second distance, the control device adjusts the third focal length of the third camera to correspond to the second focal length of the second camera.

12. The multistereo camera apparatus of claim 9, further comprising:
a focal length adjustment device configured to adjust the third focal length of the third camera under control of the control device.

13. The multistereo camera apparatus of claim 12, further comprising:
a baseline adjustment device configured to adjust a first baseline between the third camera and the first camera and a second baseline between the third camera and the second camera in association with operation of the focal length adjustment device under control of the control device.

14. The multistereo camera apparatus of claim 9, wherein the third camera is disposed between the first camera and the second camera.

15. The multistereo camera apparatus of claim 14, further comprising:
a baseline adjustment device configured to adjust a position of the third camera to adjust a first baseline between the third camera and the first camera, and a second baseline between the third camera and the first camera under control of the control device.

16. The multistereo camera apparatus of claim 15, further comprising:
a focal length adjustment device configured to adjust the third focal length of the third camera in association with operation of the baseline adjustment device under control of the control device.

17. A multistereo camera apparatus, comprising:
a first camera;
a second camera; and
a third camera disposed between the first camera and the second camera, and having a variable focal length,
wherein a distance between the third and first cameras is different than a distance between the third and second cameras, and
wherein the third camera operates in a pair with the first camera to measure a first distance and in a pair with the second camera to measure a second distance different from the first distance.

18. The multistereo camera apparatus of claim 17, wherein the third camera is movable such that the distance between the first and third cameras and the distance between the second and third cameras is adjustable.

19. The multistereo camera apparatus of claim 17, wherein the first camera has a first focal length, and the second camera has a second focal length different from the first focal length.

20. The multistereo camera apparatus of claim 17, further comprising a controller,
wherein the third camera is movable such that the distance between the first and third cameras and the distance between the second and third cameras is adjustable, and
wherein the controller controls the variable focal length of the third camera and the movement of the third camera to measure the first distance, and the third camera and the second camera to measure the second distance.

* * * * *